(12) United States Patent
Jones (10) Patent No.: US 6,891,998 B2
(45) Date of Patent: May 10, 2005

(54) METHODS AND APPARATUS FOR PASSIVE DEPOLARIZATION

(75) Inventor: Richard Jones, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 208 days.

(21) Appl. No.: 10/256,785

(22) Filed: Sep. 27, 2002

(65) Prior Publication Data

US 2004/0062476 A1 Apr. 1, 2004

(51) Int. Cl.[7] .............................. G02B 6/00; G02B 5/30
(52) U.S. Cl. ....................... 385/30; 385/11; 359/485; 359/494; 359/497
(58) Field of Search ........................... 385/11, 14, 24, 385/30, 31, 32, 50; 398/65; 359/483, 485, 494–501

(56) References Cited

U.S. PATENT DOCUMENTS

| | | | |
|---|---|---|---|
| 5,933,555 A | 8/1999 | Shen | 385/32 |
| 6,205,262 B1 | 3/2001 | Shen | 385/11 |
| 6,400,856 B1 * | 6/2002 | Chin | 385/11 |
| 6,421,471 B2 | 7/2002 | Shen | 385/11 |

OTHER PUBLICATIONS

Bismuth et al., "Low–Loss Ring Resonators Fabricated From Silicon Based Integrated Optics Technologies", Electronics Letters, vol. 27, No. 9, Apr. 25, 1991, pp. 722–724.
Bruyère, "Measurement of polarisation–dependent gain in EDFAs against input degree of polarisation and gain compression", Electronics Letters, vol. 31, No. 5, Mar. 2, 1995, pp. 401–403.
Emori et al., "Cost–effective depolarized diode pump unit designed for C–band flat–gain Raman amplifiers to control EDFA gain profile", OFC 2000, vol. 4, pp. 106–108.
Heebner et al., "SCISSOR solitons and other novel propagation effects in microresonator–modified waveguides", Optical Society of America, vol. 19, No. 4, Apr. 2002, pp. 722–731.
Heismann, "Compact Electro–Optic Polarization Scramblers for Optically Amplified Lightwave Systems", Journal of Lightwave Technology, vol. 14, No. 8, Aug. 1996, pp. 1801–1814.
Liu et al., "Fiber depolarizers lower DOP in narrowband sources", WDM Solutions, Mar. 2002, pp. 75–76, 79–80.
Martinelli et al., "Dual Fiber–Ring Depolarizer", Journal of Lightwave Technology, vol. 19, No. 6, Jun. 2001, pp. 899–905.
Sauve et al., "Passive universal depolarizer spurs Raman revolution", LIGHTWAVE, Mar. 2002, pp. 65–70.

(Continued)

*Primary Examiner*—Brian Healy
*Assistant Examiner*—Kevin S. Wood
(74) *Attorney, Agent, or Firm*—Marshall, Gerstein & Borun LLP (57) ABSTRACT

Methods and apparatus for depolarizing light are disclosed. A disclosed apparatus includes a waveguide, a first microresonator and a second microresonator. The first microresonator has a first birefringence and is evanescently coupled to the waveguide. The second microresonator has a second birefringence different than the first birefringence and is also evanescently coupled to the waveguide. A disclosed method includes evanescently coupling a first portion of input light into a first microresonator, rotating the polarization of the first portion to create a first recirculated portion, and evanescently coupling the first recirculated portion into a waveguide. The disclosed method further includes evanescently coupling a second portion of input light into a second microresonator, rotating the polarization of the second portion to create a second recirculated portion, and evanescently coupling the second recirculated portion into the waveguide.

27 Claims, 3 Drawing Sheets

OTHER PUBLICATIONS

Shen et al., "Tunable singlemode fibre depolariser", Electronic Letters, vol. 33, No. 12, Jun. 5, 1997, pp. 1077–1078.

Shen et al., "Passive fibre depolariser based on incoherent cascaded fibre–rings", Electronics Letters, vol. 34, No. 18, Sep. 3, 1998, pp. 1777–1778.

Van et al., "Propagation Loss in Single–Mode GaAs–AIGaAs Microring Resonators: Measurement and Model", Journal of Lightwave Technology, vol. 19, No. 11, Nov. 2001, pp. 1734–1739.

"Dielectric Microresonators—the Key Elements for Future DWDM Applications", website, 12 pages (undated) http://www.csl.usc.edu/research/microdisk resonators/presentation_files/preservation.pdf.

* cited by examiner

METHODS AND APPARATUS FOR PASSIVE DEPOLARIZATION

FIELD OF THE TECHNOLOGY

This disclosure relates generally to the depolarization of light, and, more particularly, to methods and apparatus for passive depolarization of light using microresonators.

BACKGROUND

Polarization or variations in polarization is a major concern for optical applications such as telecommunication systems, fiber optics, optical sensors, optical amplifiers and optical sources, all of which may have performance characteristics that are dependent on the polarization of the light. Polarization dependent properties of these devices may include gain, insertion loss, spectral response, etc. For example, in optical fiber amplifiers the amount of gain obtained is of great importance. However, Raman amplifiers and Erbium Doped Fiber Amplifiers (EDFAs), have polarization dependent gain where the amount of gain varies as a function of the degree of polarization. The degree of polarization is the ratio of the power of polarized light to the power of the total light, ranging from '1' (fully polarized light) to '0' (unpolarized light). Raman amplifiers have inherently nonlinear amplification, meaning the amount of gain achieved by the amplifier depends on the polarization of the signal being transmitted. Variations in the polarization cause variations in the gain which provides an unsatisfactory response.

In EDFAs, gain in the polarization parallel to the signal is less than the gain in the orthogonal polarization state. Hence, unwanted light noise, also called amplified spontaneous emission (ASE) energy, in the orthogonal polarization state receives more gain than the signal, degrading the signal-to-noise ratio. Though this polarization dependent gain may be small (e.g., approximately 0.1 dB for an EDFA), the signal-to-noise ratio impairment can build up in systems containing cascaded amplifiers, and, thus, can adversely affect the overall signal transmission. Therefore, there is a need to either maintain the polarization (if systems are affected by changes in polarization) or completely depolarize the light.

Many proposals have addressed these issues. For example, polarization maintaining fibers (PMFs) are used to maintain linear polarization when the input electric field is aligned with the principle axis of the fiber. However, this technique only addresses variations in polarization, and not necessarily the degree of polarization. PMFs are only applicable to highly, linearly polarized light and require careful alignment with the optical axes of the fiber, and with each other if the PMFs are cascaded. PMFs are also costly; making long distance communications expensive.

Another solution is to depolarize the light. The state of polarization of the light is changed randomly such that the overall polarization over a given period of time can be considered to be depolarized. There are both active and passive methods of depolarization. Active methods induce modulation of a waveguide's optical properties. For example, an active method may involve modulating the refractive index or birefringence of a waveguide to alter the state of polarization using acoustic or electric waves. By cycling the refractive index over a period of time, no particular state of polarization dominates. However, the light is only considered depolarized when averaged over a period of time, but maintains a high degree of polarization during narrow time intervals. This short term polarization is a problem for high speed optical devices. In addition, active methods require power supplies and drive circuitry thereby adding cost and size to the system.

Passive depolarization methods, on the other hand, are cheaper and easier to implement than active methods. Passive methods include Lyot filters and fiber recirculating loops. Lyot filters may employ two strongly birefringent plates with their principal axes rotated 45 degrees relative to each other. Different wavelengths within the polarized light experience different amounts of retardation and hence a different state of polarization. In place of the plates, birefringent (polarization-maintaining) fibers of different lengths may be spliced together after rotating their principal axes by 45 degrees with respect to each other. However, these Lyot filters have a high component cost and are limited by the linewidth of light they can depolarize, making them inefficient for narrowband sources (as often used in telecommunication systems). Though the birefringent fibers may be used for narrowband sources, these require a long length of polarization maintaining fibers thereby adding cost and size to the system.

Fiber recirculating loops delay a portion of the polarized light and couple the recirculated light back into the fiber incoherently. The birefringence of the optical fiber alters the state of polarization. Fiber recirculating loops necessarily require a loop length much larger than the coherence length of the input light and narrowband sources inherently have a large coherence length. In addition, if the bend in the loop is too tight, the fiber becomes lossy. Therefore cascaded loops are often required in order to sufficiently depolarize the light. With all these considerations, fiber recirculating loops tend to have a large footprint which increases their implementation costs.

DETAILED DESCRIPTION

Figure 1:
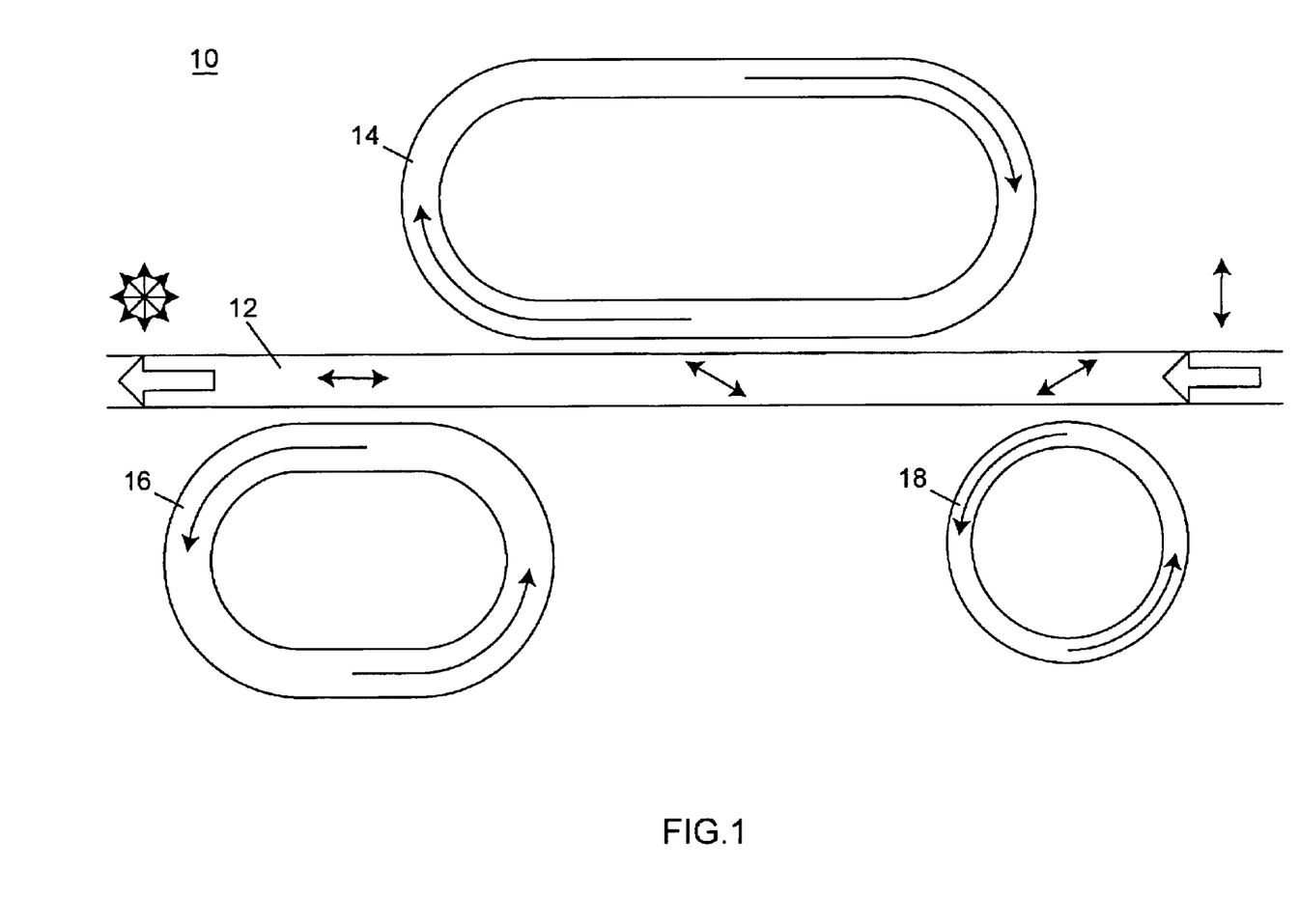
FIG. 1 is a diagram illustrating an example system for depolarizing light of any polarization.

An example passive optical depolarizer 10 is shown in FIG. 1. Although the passive optical depolarizer 10 is particularly well suited for use with optical amplifiers used in telecommunication system or the like, persons of ordinary skill in the art will readily appreciate that the teachings of the instant invention are not limited to any particular type of optical system. On the contrary, the teachings of the invention can be employed with virtually any optical components where depolarization is desired. Thus, although the passive optical depolarizer 10 will be described below primarily in relation to optical amplifiers and semiconductor lasers, persons of ordinary skill in the art will readily appreciate that the apparatus could likewise be used with other laser sources, fiber optics, optical sensors, optical circuits, etc.

Generally, the passive optical depolarizer 10 includes a waveguide 12 and multiple microresonators 14, 16, 18. In the illustrated example, the waveguide 12 is a straight waveguide integrated on a silicon-on-insulator semiconductor substrate, though the waveguide 12 may be any type of waveguide such as a fiber optic, a rectangular waveguide, a planar waveguide, a ribbed waveguide, etc. The materials used to make the waveguide 12 may include indium phosphate (InP), Silicon, Silicon Dioxide ($SiO_2$) or any other materials having an index of refraction higher than surrounding cladding layers, as understood by those of ordinary skill in the art. The waveguide 12 may be made by processes known to those of ordinary skill in the art including, but not limited to, CMOS manufacturing, separation by implantation of oxygen (SIMOX), etching, deposition, etc.

The microresonators 14, 16, 18 may be ring resonators, racetrack resonators, microring resonators, microdisk resonators, disk cavity resonators, planar dielectric rings, etc. It is not necessary that all microresonators 14, 16, 18 be of the same type. In fact, as described in an example below, the microresonators 14, 16, 18 may differ in terms of their size and shape. When viewed from above, the microresonators 14, 16, 18 may appear as a circle, disk, ellipse, annulus, obround or any other curvilinear shape. While, for simplicity, the passive optical depolarizer 10 will primarily be described as including ring resonators, those of ordinary skill in the art will readily appreciate that various types of microresonators may be utilized with the passive optical depolarizer 10.

Each of the microresonators 14, 16, 18 includes a waveguide. Many waveguides used in optical systems have a strong structural birefringence. The birefringence of a waveguide is strongly dependent on waveguide parameters such as the core thickness, cladding layer thickness, core composition, cladding layer composition, and waveguide profile. In relation to waveguide profile, the birefringence decreases as the width decreases. Furthermore, varying the depth of the waveguide and/or varying the angle of the side wall will influence the birefringence of the waveguide.

The microresonators 14, 16, 18 are evanescently coupled to the waveguide 12 so as to capture a portion of the light being transmitted through the waveguide 12. Therefore, the microresonators 14, 16, 18 are located proximate the waveguide 12 so as to achieve evanescent wave interaction. That is, when light is input into the waveguide 12, a portion of the light is coupled into each microresonator 14, 16, 18 from the evanescent field of the input light. In order to achieve evanescent coupling, the microresonators 14, 16, 18 may be positioned laterally to the waveguide 12, or from above or below the waveguide 12. For ease of discussion, only microresonators positioned laterally to the waveguide will be discussed below. However, those of ordinary skill in the art will readily appreciate that other configurations could likewise be employed. In the illustrated example, microresonators 14, 16, 18 are spaced from each other such that optical coupling or evanescent coupling between the microresonators 14, 16, 18 is minimized.

The illustrated microresonators 14, 16, 18 are formed in the same substrate as the waveguide 12 using a similar manufacturing processes such as CMOS or SIMOX. The specific methods of manufacture are well known to those of ordinary skill in the art and, thus, will not be described further herein. Those of ordinary skill in the art will further appreciate that light loss, bending loss, etc. occurs as light travels through the curved portions of a microresonator 14, 16, 18 and, therefore, will understand the importance of surface smoothness, radius of curvature and other design considerations.

Figure 2:
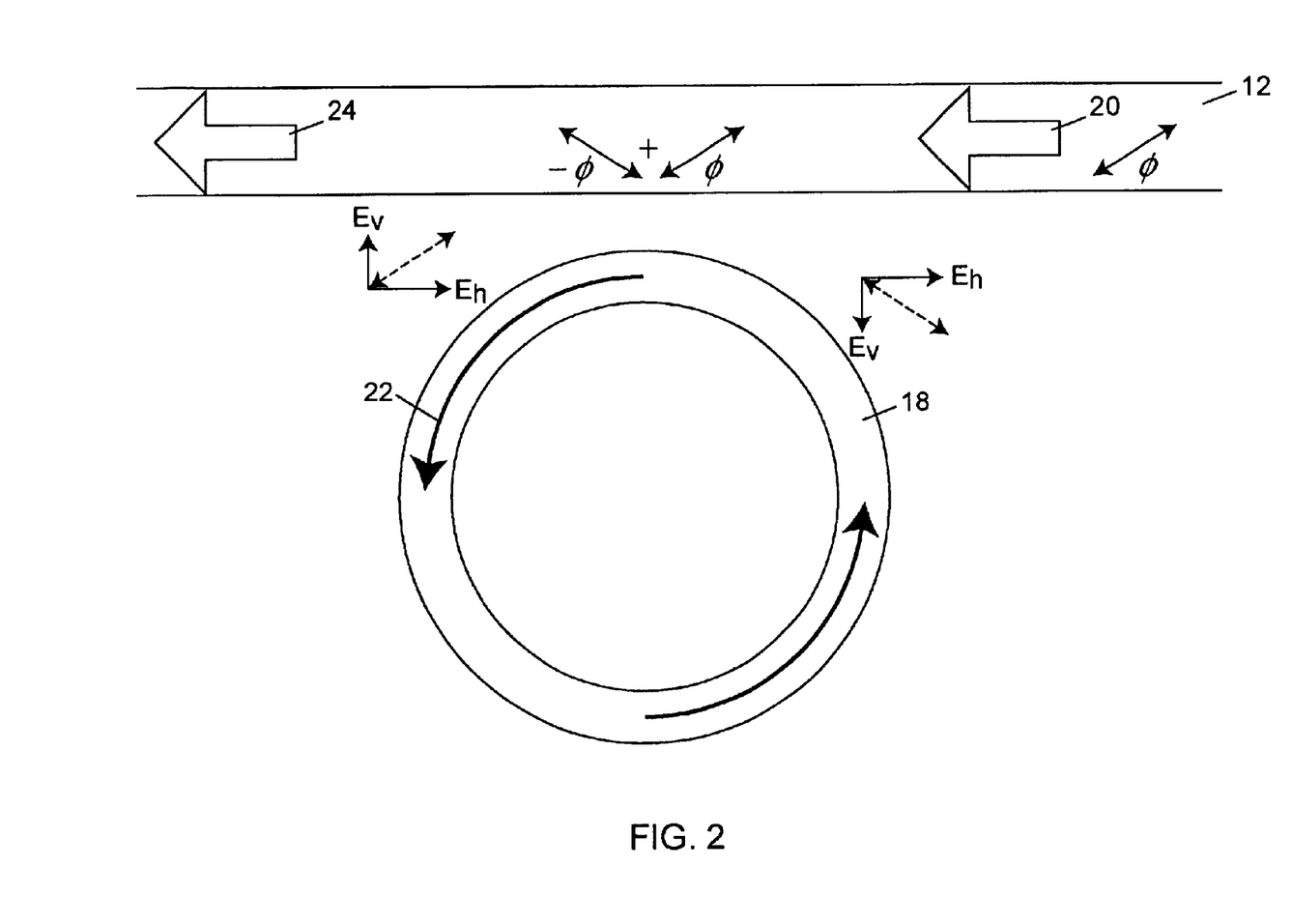
FIG. 2 is a diagram illustrating a portion of the example system of FIG. 1 in more detail.

As shown in FIG. 2, light 20 is input to the waveguide 12 from an optical source. Preferably, the light is coupled to the waveguide 12 directly from the light source. Common light sources in optical amplifiers include pump laser diodes, Fabry-Perot laser diodes, and other semiconductor light sources etc. These light sources produce highly polarized input light. However, the input light may alternatively be only partially polarized, as would be the case with input light from a light emitting diode or the like. In either case, it is preferred that depolarization occur at the source rather than downstream so as to not affect data transmissions that may be carried by the light. In an example described further below, the passive optical depolarizer 10 is integrated on the same substrate as a semiconductor light source.

Referring again to FIG. 2, a portion of the polarized input light 20 is evanescently coupled into the ring resonator 18. The input light 20 may be of any state, type or degree of polarization. As mentioned above, the ring resonator 18 is birefringent. The birefringence of the ring resonators 18 is different than the birefringence of the waveguide 12, to ensure the polarization direction will be rotated. The waveguide of the ring resonator 18 also has two optical axes, each accepting a polarization direction orthogonal to the other. Any input light 20 having a polarization direction that is not horizontal or vertical is rotated. For the sake of simplicity, the optical axes are referred to as horizontal and vertical, though those of ordinary skill in the art will understand that this does not need to be the actual orientation of the axes.

The birefringence of the ring resonator 18 splits the coupled light into two, unequally refracted rays. One ray travels along a fast axis of the waveguide and the other travels along a slow axis independent of the ray in the fast axis. Each axis has its own refractive index, and light traveling along the fast axis has a polarization direction orthogonal to the light traveling along the slow axis. In effect, one ray travels faster than the other causing a retardation of the ray along the slow axis. Upon recombination of the rays at the waveguide output, the slower ray is out of phase with the faster ray. Thus, the polarization of the recombinant light is rotated so as to have a state of polarization different from that of the input light 20. The amount of phase retardation, and hence polarization rotation, depends on the length of the ring resonator 18. The further the light travels, the more it will be retarded. As explained above, the profile of the waveguide also has a strong effect on the birefringence of the ring resonator 18 which affects how much the polarization state is rotated.

In an illustrative example, the ring resonator 18 has a fast axis that accepts a linear horizontal polarization and a slow axis that accepts a linear vertical polarization. The length and birefringence of the ring resonator 18 is such that a ray of light along the slow axis experiences a phase retardation of 180° as compared to the ray of light along the fast axis. Input light 20 has a state of polarization at angle φ which is between the horizontal and vertical polarization axes. Upon evanescently coupling a portion of the input light 20 into the ring resonator 18, the coupled light splits into two components. The input light 20 having a state of polarization at angle φ can be considered to have a vertical component ($E_V$) and a horizontal component ($E_H$). As the coupled light travels through the ring resonator 18, the vertical component travels slower. This causes the polarization of the light in the ring resonator 18 to rotate while traveling the length of the ring resonator 18. As mentioned, the length of the ring resonator 18 is such that light along the slow axis (vertical component) experiences a 180° phase retardation. That is, the vertical component has rotated 180° as compared to the horizontal component. Upon the recombination of the light, the horizontal and vertical components combine to give a resultant state of polarization at angle −φ.

The recirculated light 22 is evanescently coupled back into the waveguide 12 and combined with the light that continued to travel through the waveguide 12 (i.e., the throughput light). The recirculated light 22 is coupled incoherently with the throughput light, such that the polarization of the recirculated light 22 is added randomly.

Ideally, exactly half of the input light 20 is evanescently coupled into the ring resonator 18. The ring resonator 18 then rotates the state of polarization to its orthogonal counterpart and all the recirculated light 22 is incoherently coupled back into the waveguide 12. In this scenario, exactly half of the input light 20 experiences orthogonal polarization rotation, which effectively causes a random state of polarization in the output light 24 with no single state of polarization dominating. The output light 24 therefore does not have any particular state of polarization for a given length of time and the degree of polarization can be considered to be near zero, even at short intervals.

However, in practice it is more likely that a single pass through the ring resonator 18 will not fully rotate the polarization to its orthogonal state. This incomplete rotation results partly from the length of the ring resonator 18 versus the initial state of polarization. In the example given above, the length of the ring resonator 18 was such that the vertical component experienced a 180° rotation versus the horizontal component. However, it can be seen in FIG. 2 that the resultant polarization was not orthogonal to the polarization of the input light 20. In fact, the only time the resultant polarization is orthogonal to the input polarization is when the input polarization is 45° to the optical axes. That is, the vertical component ($E_v$) and the horizontal component ($E_H$) are equal in magnitude. Therefore, a 180° rotation of the vertical component results in a −45° state of polarization, which is orthogonal to the state of polarization of the input light 20. An additional factor affecting the degree of rotation is the amount of birefringence in the ring resonator 18.

In another case, there may be no change in polarization at all. For example, if the input light 20 had a polarization that was exactly horizontal, there would be no vertical component and hence no retardation of one component with respect to the other. The horizontal optical axis of the ring resonator 18 would simply let the light pass through.

In order to be able to rotate the polarization of input light 20 having any polarization, multiple microresonators are used. Each microresonator 14, 16, 18 may have different lengths. By increasing or decreasing the length of the microresonator, the distance traveled by the light is increased and the slow axis component experiences more retardation. If the length of the waveguide is doubled then the phase shift is doubled. In addition to the length of the microresonator 14, 16, 18, the profiles of the waveguides comprising the microresonators 14, 16, 18 may be constructed to achieve a specific birefringence for each. By changing the profile of the waveguides 14, 16, 18, the birefringence of that waveguide 14, 16, 18 is altered, thereby causing a different rotation of polarization through the changed microresonator 14, 16, 18. Therefore, the dimensions (i.e., length and profile) of the microresonators 14, 16, 18 are chosen to achieve a specific degree of polarization rotation. Such choosing is within the skill of a person of ordinary skill in the art familiar with this disclosure.

In the example of FIG. 1, each microresonator 14, 16, 18 is arranged along the waveguide 12 such that each microresonator 14, 16, 18 evanescently couples a portion of the input light 20. As described above, each microresonator 14, 16, 18 is able to rotate a different polarization state. If one of the microresonators 14, 16, 18 is unable to rotate the polarization to its orthogonal component or unable to rotate the polarization at all, another microresonator 14, 16, 18 having a different length and/or waveguide profile is available to rotate the polarization. In effect, input light 20 of any polarization is depolarized by virtue of multiple microresonators 14, 16, 18 having different shapes, lengths, optical lengths, waveguide profiles, materials, birefringence, etc. The cascading microresonators 14, 16, 18 ensure that various states of polarization will be added to the throughput light and collectively amount to a polarization orthogonal to the input polarization, thereby helping to lower the overall degree of polarization in the output light 24.

However, even with various states of polarization being added to the throughput light, the output light 24 will still have a high degree of polarization unless a sufficient amount of the input light 20 is coupled into the microresonators 14, 16, 18. As mentioned above, ideally 50% of the light is coupled into the ring resonator 18 and rotated to its orthogonal direction. More likely, only around 20% of the light may be evanescently coupled into the ring resonator 18.

Figure 3:
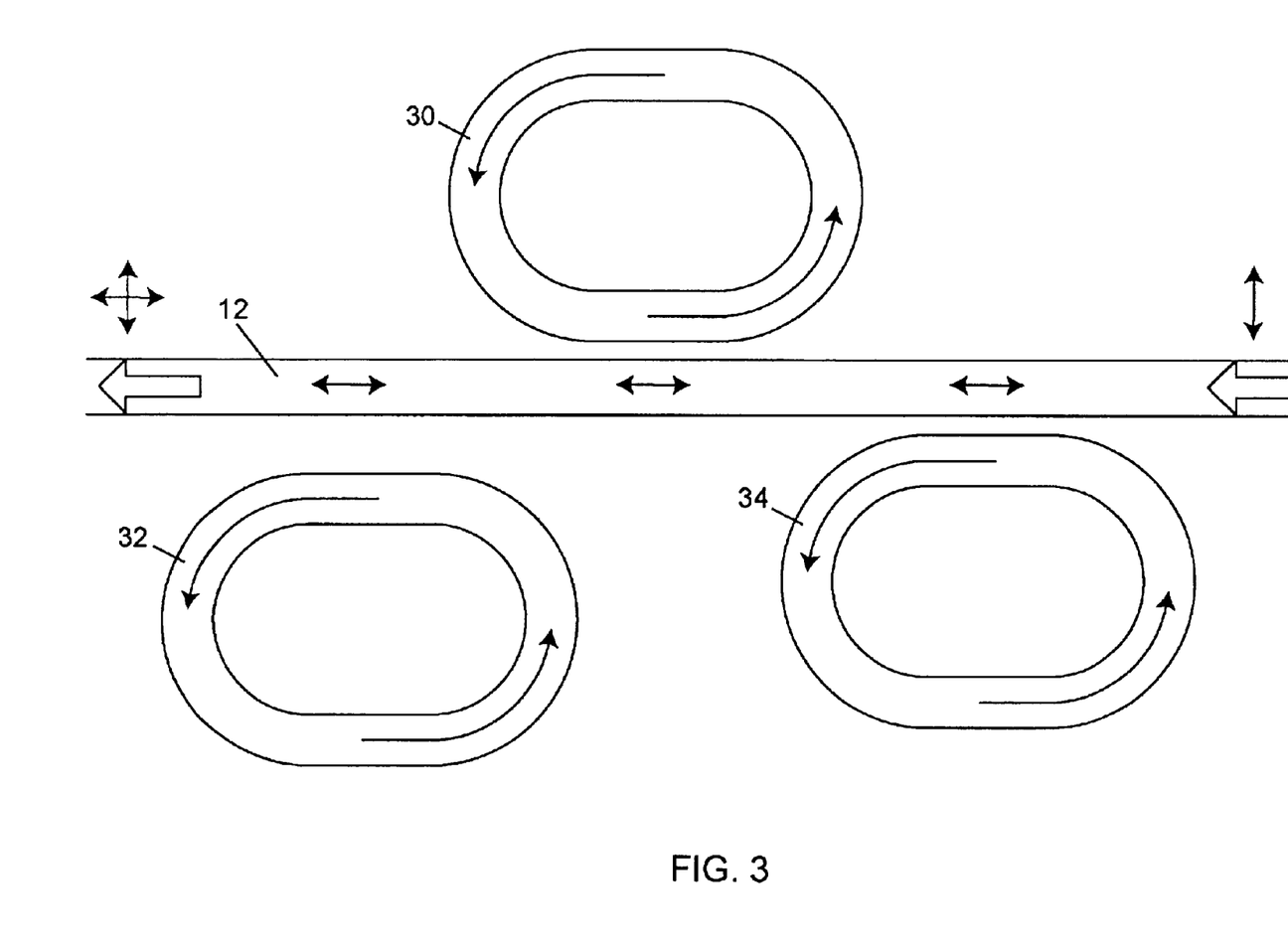
FIG. 3 is a diagram illustrating an example system for rotating the polarization of input light by the same degree using multiple microresonators.

As shown in FIG. 3, in order to rotate the polarization direction of approximately 50% of the input light 20, multiple microresonators 30, 32, 34 may be employed. In the example of FIG. 3, each of the microresonators 30, 32, 34 has the same dimensions, and, thus, rotate the polarization by the same amount. In other words, the same shape, length (both optical and actual), waveguide profiles, materials, and birefringence are employed by each of the microsonators 30, 32, 34 in the example of FIG. 3. Each of the microresonators 30, 32, 34 couples a portion of the input light 20. Together, the microresonators 30, 32, 34 rotate the polarization of approximately 50% of the light by the same degree. The proximity of the microresonators 30, 32, 34 to the waveguide 12 may be varied such that evanescent coupling in some microresonators is stronger than in others. In the example of FIG. 3, two microresonators 30, 34 are proximate the waveguide 12 and a third microresonator 32 is positioned slightly further away from the waveguide 12 so that the microresonator 32 couples less light.

In order to couple the recirculated light 22 incoherently, the distance traveled by the recirculated light must be greater than the coherence length of the input light. If the recirculated light 22 is delayed by less than the coherence length (i.e., if the distance traveled is less than the coherence length) then the waves of the recirculated light 22 and the throughput light interefere to either add or cancel out, resulting in unpredictability in the output light 24. However, just as less than 50% of the input light 20 will evanescently couple into each of the microresonators, the recirculated light 22 will not evanescently couple back into the waveguide 12 entirely. Instead, the recirculated light 22 will generally remain in the microresonator for a few loops before it all couples back into the waveguide 12. This means that some of the recirculated light 22 may travel at least three times the length of the microresonator before it is coupled back into the waveguide 12. This allows the optical length of the microresonators 14, 16, 18, 30, 32, 34 to be comparable to the coherence length of the input light 20. Indeed, these optical lengths can actually be smaller than the coherence length.

For example, if the input light 20 has a 1 nanometer bandwidth at a wavelength of 1550 nanometers, it has a coherence length of approximately 2.4 millimeters. At a minimum, the optical length (refractive index multiplied by the actual length) should be half the coherence length, or in this case 1.2 millimeters. Even taking only a few loops around a microresonator 14, 16, 18, 30, 32, 34, the recirculated light 22 travels 3.6 millimeters which is still more than the coherence length. By using microresonators 14, 16, 18, 30, 32, 34, a tight bending radius can be used without becoming lossy. Any loss in the device is limited only to the resonators 14, 16, 18, 30, 32, 34 which can have a transmission loss such as 0.5 dB. Therefore, not only can the optical lengths of the microresonators 14, 16, 18, 30, 32, 34 be on the same order as the coherence length, but they can actually be smaller than the coherence length.

By utilizing multiple microresonators 14, 16, 18, 30, 32, 34 that rotate the polarization by the same degree and also multiple microresonators that rotate the polarization by various degrees, the entire input light 20 is depolarized. The various microresonators 14, 16, 18, 30, 32, 34 arranged along the waveguide 12 ensure that input light of any polarization can be depolarized and that the degree of polarization of that output light is minimal. Incoherent re-coupling ensures that the new polarization states are added back randomly. The output light 24 therefore comprises varying states of polarization randomly added together such that no one state of polarization dominates and the output light has a low degree of polarization. In effect, the state of polarization cannot be predicted at any point in time and the degree of polarization is small, even over small time intervals.

In addition to employing microresonators 14, 16, 18, 30, 32, 34 on the same substrate as the waveguide 12, the microresonators 14, 16, 18, 30, 32, 34 and waveguide 12 may also be formed on the same substrate as a semiconductor light source such as a pump diode laser. The techniques used may be similar to those used to form straight, planar waveguides on the same substrate as a semiconductor laser with only the addition of forming microresonators 14, 16, 18, 30, 32, 34 alongside the waveguide. A self-depolarizing semiconductor laser device may, therefore, be manufactured having a small footprint and low cost without the need for external power sources or drive circuitry. Furthermore, any problems associated with coupling or accidental decoupling of the light source with the depolarizer are averted. Any number and type of microresonators 14, 16, 18, 30, 32, 34 may be added to accommodate any polarization.

Although certain examples of methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A passive optical depolarizer for depolarizing a polarized light source, the passive optical depolarizer comprising:
    a waveguide;
    a first microresonator having a first birefringence, the first microresonator being evanescently coupled to the waveguide; and
    a second microresonator having a second birefringence different than the first birefringence, the second microresonator being evanescently coupled to the waveguide.

2. A passive optical depolarizer as described in claim 1, further comprising a third microresonator having a third birefringence which is substantially the same as the first birefringence, the third microresonator being evanescently coupled to the waveguide.

3. A passive optical depolarizer as described in claim 1 wherein the waveguide has a third birefringence different from the first birefringence and the second birefringence.

4. A passive optical depolarizer as described in claim 1 wherein the first microresonator has a first optical length and the second microresonator has a second optical length.

5. A passive optical depolarizer as defined in claim 4 wherein the first optical length is different than the second optical length.

6. A passive optical depolarizer as defined in claim 4, further comprising a third microresonator having a third optical length which is substantially the same as the first optical length, the third microresonator being evanescently coupled to the waveguide.

7. A passive optical depolarizer as described in claim 1 wherein the first microresonator includes a waveguide region having a first cross-sectional profile and the second microresonator includes a waveguide region having a second cross-sectional profile.

8. A passive optical depolarizer as defined in claim 7 wherein the first cross-sectional profile is different than the second cross-sectional profile.

9. A passive optical depolarizer as defined in claim 7, further comprising a third microresonator including a waveguide region having a third cross-sectional profile which is substantially the same as the first cross-sectional profile, the third microresonator being evanescently coupled to the waveguide.

10. A passive optical depolarizer as defined in claim 1 wherein at least one of the first and second microresonators comprises at least one of a ring resonator, a microring resonator, a microdisk resonator, a disk cavity resonator, a planar dielectric ring, and a racetrack resonator.

11. A passive optical depolarizer as defined in claim 1 wherein the first and second microresonators each have an optical length on substantially the same order as a coherence length of the polarized light source.

12. A method of depolarizing input light having an input degree of polarization, wherein the input light is propagated through a waveguide, the method comprising:
    evanescently coupling a first portion of the input light from the waveguide into a first microresonator;
    rotating a polarization of the first portion passing through the first microresonator to create a first recirculated portion having a first state of polarization;
    evanescently coupling the first recirculated portion from the first microresonator to the waveguide;
    evanescently coupling a second portion of the input light from the waveguide into a second microresonator;
    rotating a polarization of the second portion passing through the second microresonator to create a second recirculated portion having a second state of polarization; and
    evanescently coupling the second recirculated portion from the second microresonator to the waveguide.

13. A method as defined in claim 12 wherein coupling the first and second recirculated portions from the first and second microresonators comprises incoherent coupling.

14. A method as defined in claim 12 wherein the input light comprises the first portion, the second portion and a throughput portion, and wherein coupling the first and second recirculated portions comprises:
    combining the first and second recirculated portions with the throughput portion to create output light wherein the output light comprises an output degree of polarization less than the input degree of polarization.

15. A method as defined in claim 12 wherein the first and second states of polarization are different from the input degree of polarization.

16. A method as defined in claim 12 wherein the first state of polarization and the second state of polarization are the same.

17. A method as defined in claim 12 wherein the first state of polarization and the second state of polarization are different.

18. A self-depolarizing light source comprising:
- a substrate layer;
- a semiconductor optical source formed over the substrate layer and arranged to emit light from an output, wherein the light has a degree of polarization greater than zero;
- a straight waveguide formed over the substrate layer and comprising an input optically coupled to the output of the semiconductor optical source;
- a first microresonator formed over the substrate layer and comprising a first curvilinear waveguide having a first optical length; the first microresonator being evanescently coupled to the straight waveguide; and
- a second microresonator formed over the substrate layer and comprising a second curvilinear waveguide having a second optical length different from the first optical length, the second microresonator being evanescently coupled to the straight waveguide.

19. A self-depolarizing light source as defined in claim 18, further comprising a third microresonator formed over the substrate layer and comprising a third curvilinear waveguide having a third optical length which is substantially the same as the first optical length.

20. A self-depolarizing light source as defined in claim 18 wherein the first curvilinear waveguide has a first cross-sectional profile and the second curvilinear waveguide has a second cross-sectional profile different from the first cross-sectional profile.

21. A self-depolarizing light source as defined in claim 18, wherein the first curvilinear waveguide has a first cross-sectional profile, and wherein the self-depolarization light source includes a third microresonator formed over the substrate layer and comprising a third curvilinear waveguide having a third cross-sectional profile which is substantially the same as the first cross-sectional profile.

22. A self-depolarizing light source as defined in claim 18 further comprising:
- an insulating layer overlying the substrate layer;
- a silicon layer overlying the insulating layer, wherein the straight waveguide, the first microresonator and the second microresonator are formed within the silicon layer.

23. A self-depolarizing light source as defined in claim 22 wherein the insulating layer has a refractive index lower than the refractive index of the silicon layer.

24. A self-depolarizing light source as defined in claim 22 wherein the insulating layer comprises an oxide layer.

25. A self-depolarizing light source as defined in claim 18 wherein the first and second optical lengths are on substantially the same order as a coherence length of the light.

26. A self-depolarizing light source as defined in claim 18 wherein the semiconductor optical source comprises at least one of a semiconductor laser diode, a light emitting diode, a Fabry-Perot laser diode, and a pump laser diode.

27. A self-depolarizing light source as defined in claim 18 wherein at least one of the first and second microresonators comprises at least one of a ring resonator, a microring resonator, a microdisk resonator, a disk cavity resonator, a planar dielectric ring, and a racetrack resonator.

* * * * *

UNITED STATES PATENT AND TRADEMARK OFFICE
CERTIFICATE OF CORRECTION

PATENT NO. : 6,891,998 B2
DATED : May 10, 2005
INVENTOR(S) : Richard Jones

It is certified that error appears in the above-identified patent and that said Letters Patent is hereby corrected as shown below:

<u>Column 9,</u>
Line 8, after "optical" please delete "length;" and insert -- length, -- in its place .

Signed and Sealed this

Thirtieth Day of August, 2005

JON W. DUDAS
*Director of the United States Patent and Trademark Office*